United States Patent
Balakrishnan et al.

(10) Patent No.: US 10,725,684 B2
(45) Date of Patent: Jul. 28, 2020

(54) METHOD AND APPARATUS FOR COST-BASED LOAD BALANCING FOR PORT SELECTION

(71) Applicant: EMC Corporation, Hopkinton, MA (US)

(72) Inventors: Ajith Balakrishnan, Bangalore (IN); Felix Shvaiger, Brighton, MA (US); Alexandr Veprinsky, Brookline, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/502,327

(22) Filed: Sep. 30, 2014

(65) Prior Publication Data
US 2016/0092136 A1 Mar. 31, 2016

(51) Int. Cl.
*G06F 3/06* (2006.01)

(52) U.S. Cl.
CPC .......... *G06F 3/0635* (2013.01); *G06F 3/0613* (2013.01); *G06F 3/0659* (2013.01); *G06F 3/0683* (2013.01)

(58) Field of Classification Search
CPC .. H04W 76/025; H04W 28/065; H04L 69/14; H04L 47/125; G06F 17/30424; G06F 3/067; G06F 9/5088; G06F 9/5083; G06F 3/0611; G06F 3/0613; G06F 3/061; G06F 3/0656; G06F 3/0659; G06F 3/0631; G06F 3/0635; G06F 3/0683; G06F 11/3433; G06F 11/3442
See application file for complete search history.

(56) References Cited

U.S. PATENT DOCUMENTS

| | | | |
|---|---|---|---|
| 7,839,788 B2 | 11/2010 | Qi | |
| 2002/0124132 A1* | 9/2002 | Haines | G06F 3/0613 711/112 |
| 2004/0010667 A1* | 1/2004 | Brenner | G06F 9/5088 711/158 |
| 2008/0209116 A1* | 8/2008 | Caulkins | G11C 16/10 711/103 |
| 2010/0191876 A1* | 7/2010 | Muppirala | G06F 3/0613 710/39 |
| 2012/0011191 A2* | 1/2012 | Kaspar | H04W 76/025 709/203 |
| 2014/0282918 A1* | 9/2014 | Rothschild | H04L 63/0815 726/4 |
| 2015/0058475 A1* | 2/2015 | Earl | H04L 47/24 709/224 |

FOREIGN PATENT DOCUMENTS

CN 101395889 A 3/2009

\* cited by examiner

*Primary Examiner* — Ernest Unelus
(74) *Attorney, Agent, or Firm* — Ryan, Mason & Lewis, LLP

(57) ABSTRACT

Example embodiments relate to a method, a system, and a computer program product for load balancing for port selection. The method includes determining a processing load for each storage port in a plurality of storage ports having variable processing power and calculating a delay characteristic for each storage port of the plurality of storage ports according to its processing load. A command then may be sent to a selected storage port of the plurality of storage ports according to the delay characteristics and a policy.

21 Claims, 8 Drawing Sheets

METHOD AND APPARATUS FOR COST-BASED LOAD BALANCING FOR PORT SELECTION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to storage path management and, more specifically, to load balancing for port selection in a multipathing environment.

BACKGROUND

Enterprise storage systems store data in large-scale environments and differ from consumer storage systems in both the size of the environment and the types of technologies that store and manage the data. Storage area networks (SANs) are commonly used in enterprise storage systems to transfer data between computer systems and storage devices. A typical SAN provides a communication infrastructure, including physical connections between computer systems, storage devices, and a management layer that organizes the connections between computer systems and storage devices.

In a SAN environment, computer systems, typically referred to as hosts, connect to the SAN via one or more host bus adapters. In the case of a Fibre Channel SAN, the physical connections between hosts and storage devices may include special Fibre Channel host bus adapters, Fibre Channel switches, Fibre Channel routers, and optical fiber.

Storage devices may include multiple disk drives that combine to form a disk array. A typical disk array includes a disk array controller, a cache, disk enclosures, and a power supply. Examples of disk arrays include the Symemtrix® Integrated Cache Disk Array System the CLARiiON® Disk Array System, both available from EMC Corporation of Hopkinton, Mass. A disk array controller is a piece of hardware that provides storage services to computer systems that access the disk array. The disk array controller may attach to a number of disk drives that are located in the disk enclosures. For example, the disk drives may be organized into redundant array of inexpensive disks (RAID) groups for redundancy and efficient performance. RAID is a system that uses multiple disk drives that share or replicate data among the drives. Accordingly, a RAID system can present multiple physical hard drives to a host as a single logical disk drive.

Disk array controllers connect to a SAN via a port. A port serves as an interface between the disk array controller and other devices, such as the hosts, in the SAN. Each disk array controller typically includes two or more ports. Disk array controllers may communicate with other devices using various protocols, such as the SCSI (Small Computer System Interface) command protocol over a Fibre Channel link to the SAN. In the SCSI command protocol, each device is assigned a unique numerical identifier, which is referred to as a logical unit number (LUN). Further, communication using the SCSI protocol is said to occur between an "initiator" (e.g., a host bus adapter port) and a "target" (e.g., a storage controller port) via a path (i.e., a storage path). For example, a path may include a host bus adapter port, associated SCSI bus or Fibre Channel cabling, a disk array port, and a LUN. The types of path components in use vary with the storage I/O transport technology in use.

Management of storage paths is provided by path management software. Path management software is a host-based software solution that is used to manage paths and, among other things, can detect load imbalances across paths and buses and can identify alternate paths through which to route data. An example of path management software is PowerPath® by EMC Corporation of Hopkinton, Mass.

Although prior path management software systems may monitor load balances and identify alternate paths through which to route data, a network or storage administrator must evaluate network path faults. Current approaches for detecting setup and path problems in a SAN require analysis of difficult to read output from various user interfaces, including Command Line Interfaces (CLIs). Although custom programming and scripts are available to monitor system logs and device states, the number of path faults that an administrator must identify and remedy increases dramatically as the amount of data and number of physical connections between initiators and targets increase. This may cause a delay in the administrator restoring a path, and lead to increased costs due to having administrators responsible for managing path management. Further, detecting setup and path problems in prior path management systems require the use of custom programming/scripts to monitor system logs and device states or a host-based CLI typically accessed via remote shell and analysis of complex and unwieldy text output from CLIs.

SUMMARY

Example embodiments relate to a method, a system, and a computer program product for load balancing for port selection. The method includes determining a processing load for each storage port in a plurality of storage ports having variable processing power and calculating a delay characteristic for each storage port of the plurality of storage ports according to its processing load. A command then may be sent to a selected storage port of the plurality of storage ports according to the delay characteristics and a policy.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
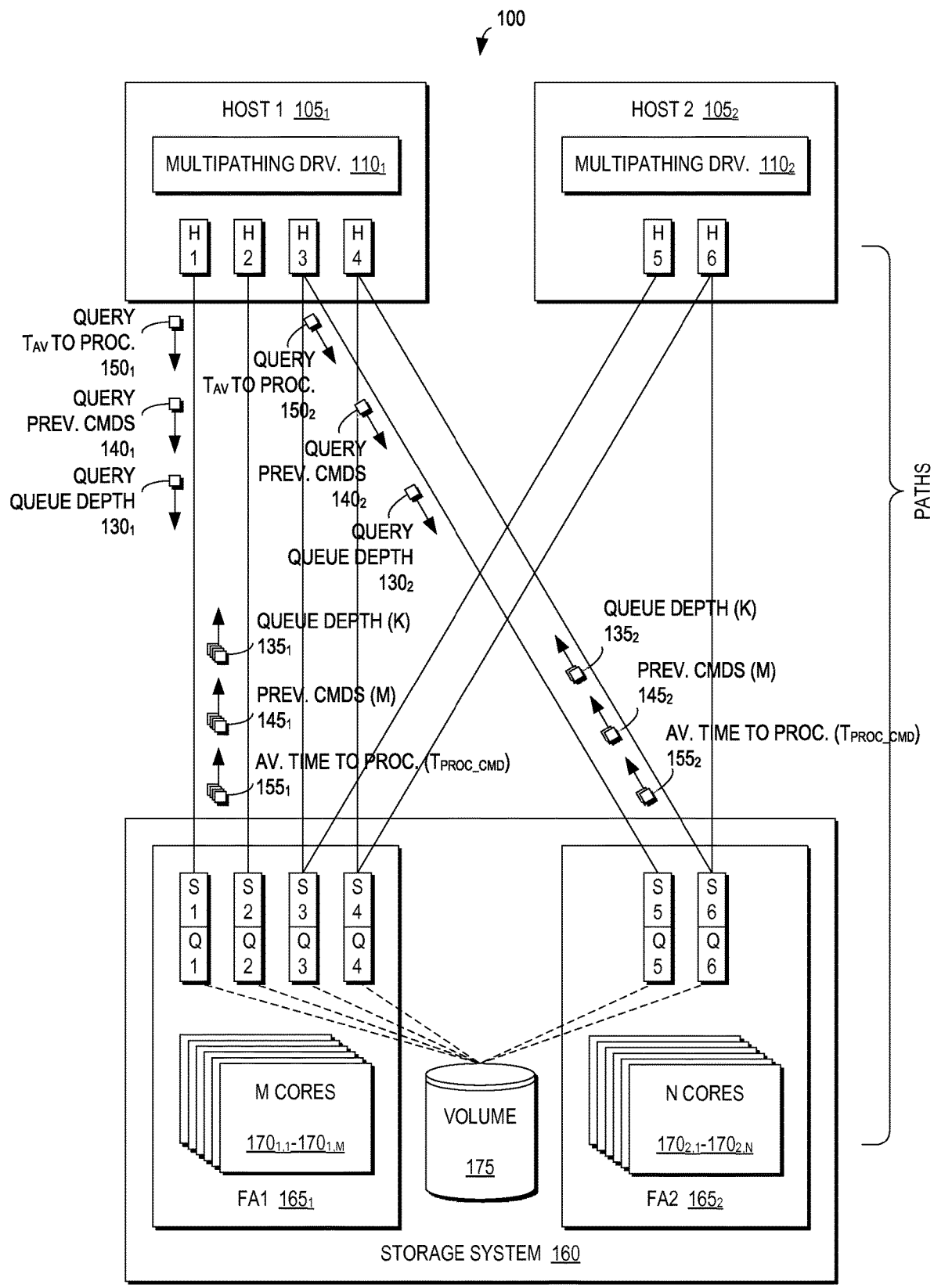
FIG. 1 is a block diagram of a multipathing environment, including a plurality of storage ports having variable processing power, according to an example embodiment of the present invention.

FIG. 1 is a block diagram of a multipathing environment (i.e., data center) 100, including a plurality of storage ports S1-S6 (S generally) having variable processing power, according to an example embodiment of the present invention. As illustrated in FIG. 1, a storage system 160 may provide a storage volume 175 for I/O operations with a plurality of hosts (e.g., host 1 $105_1$ and host 2 $105_2$) (105 generally). The hosts 105 may be communicatively coupled with the volume 175 via a plurality of paths from respective host ports H1-H6 through the plurality of storage ports S1-S6 with port selection at each host 105 managed by a multipathing driver $110_1$, $110_2$ (110 generally). Such multipath storage environments 100 typically are deployed with redundancies for enterprise purposes. As illustrated in FIG. 1, host 1 $105_1$ has six paths to the volume 125 (i.e., H1/S1, H2/S2, H3/S3, H4/S4, H3/S5, and H3/S6) and host 2 $105_2$ has three paths to the volume 175 (i.e., H5/S3, H6/S4, and H6/S6). These redundancies in data centers 100 provide value by preventing data unavailability (DU).

The data storage system 160 may also include different types of adapters or directors, such as a host adapter (HA) or front-end adapter (FA) (note, FA and FE may be used interchangeably) (e.g., FA1 $165_1$ and FA2 $165_2$) (165 generally), a remote adapter (RA) (not shown), and/or a device interface disk adapter (DA) (not shown). In an embodiment, the FAs may be used to manage communications and data operations between one or more host systems. In an embodiment, the RA may be used, for example, to facilitate communications between data storage systems. In an embodiment, the DAs may interface with hard drives, flash drives, and the like. Each of the adapters may be implemented using hardware including one or more processors with local memory with code stored thereon for execution in connection with performing different operations.

In an embodiment, the FA may be a Fibre Channel Adapter or other adapter which facilitates host communication and may be characterized as a front-end component of the data storage system which receives a request from the host. The DAs may also be characterized as back-end components of the data storage system which interface with the physical data storage devices. One or more internal logical communication paths may exist between the DAs, the RAs, the HAs, and internal memory (not shown). An embodiment, for example, may use one or more internal busses and/or communication modules. For example, there may be global memory that may be used to facilitate data transfers and other communications between the DAs, HAs, and/or RAs in a data storage system 160. In one embodiment, the DAs may perform data operations using a cache that may be included in the global memory, for example, when communicating with other DAs and other components of the data storage system 160.

Traditional adaptive load balancing algorithms employed by multipathing I/O (MPIO) driver policies include static, round robin, weighted, and path response time. These policies consider only factors that can be measured from a host, such as information regarding I/Os sent to a storage array (e.g., number, size, read or write), observed queueing delay, latency on each path, and throughput of recent I/Os, and do not use actual array port performance attributes. While these policies work when a storage array's front end (FE) ports all have equal processing power, such policies are inefficient for load balancing across storage ports having variable processing power.

Further, in more complex multipathing environments including a plurality of hosts, each host does not have visibility into the I/O load the other hosts are imposing on the storage ports. While traditional MPIO drivers may monitor response time of each storage port as an indicator of the storage port's load, response time is not a good indicator of load (especially in a round robin policy) because they operate on the assumption that a high response time is indicative of a deep queue despite there being no indication of whether a storage port's response time is increased as a result of a number of I/Os queued for processing or because of a size of the I/Os queued for processing.

Accordingly, example embodiments of the present invention overcome these and other deficiencies of the prior art by allowing a multipathing host to take into account actual performance data regarding a storage port, rather than assuming a load on the storage port, and to take into consideration variable processing power of the storage ports and their respective loads. Example embodiments of the present invention provide a performance policy that maximizes performance in a multipathing environment where the FE ports have variable processing power and load. In other words, the FE directors may be assigned a variable number of cores based on the overall system (i.e., board) needs. Therefore, a particular FE port may be able to process more (or fewer) commands per second based on its core allocation.

The storage ports S1-S6 may be provided on respective FAs 165 each having a respective number of a plurality of processing cores (e.g., M cores $170_{1,1}$-$170_{1,M}$ on FA1 $165_1$ and N cores $170_{2,1}$-$170_{2,N}$ on FA2 $165_2$) (170 generally). Each storage port S1-S6 has a respective queue Q1-Q6 for queuing I/Os received from the hosts 105 prior to processing. It should be noted that a relationship between the number of host ports H1-H6 and the number of storage ports S1-S6 is not required. Further, it should be understood that the multipathing driver 110 may present the volume 175 as a logical storage unit available via the storage ports S1-S6, thereby masking the internal complexities of the director structure. Although FIG. 1 omits the DAs, RAs, the global memory, and the internal communications busses and/or communication modules between the directors (e.g., FAs, DAs, and RAs) one of ordinary skill in the art will understand that such internal communications and components are represented by the dashed lines from the storage ports S1-S6 to the volume 175. Moreover, it should be understood that, the paths may pass through one or more switches, which are omitted from FIG. 1 for simplicity.

In modern storage systems, each port/emulation can be assigned a dynamic number of cores on a board depending on a policy (i.e., each FA, DA, and RA on a board may have a certain number of cores assigned). For example, if a board has ten cores, a policy may set the number of cores as even across the FA, DA, and RA, with one extra core. In another example, a policy may set the number of cores at the FA as heavy (e.g., five), and leave the other five cores to be shared between the DA and the RA. In yet another example, a policy may set a heavy back end. It should be understood that dynamic assignment of cores may not assign cores from one FA to another (e.g., from FA1 $165_1$ to FA2 $165_2$ as they are on difference boards); rather, cores may be dynamically assigned between the FA, DA, and RA on a particular board.

However, the fact that all FAs in a storage system 160 are not the same (as a result of dynamic core assignment) presents problems. In such storage systems, a multipathing driver 110 does not know whether a particular storage port S is more performant because of queue depth, I/Os size, and now processing power of the port. However, although a multipathing driver 110 may be able to select ports when a number of cores assigned to a particular storage port is known, with the rapid growth of the number of ports available on an FA (e.g., from two ports in a previous storage system generation to up to sixty-four ports in a current storage system generation) such tracking becomes unmanageable. However, because cores may be dynamically assigned to the FA, queue depth at each storage port is more interesting as it is impacted by how many cores the FA is assigned. Therefore, examining only queue depth is not sufficient to select a port.

Figure 4:
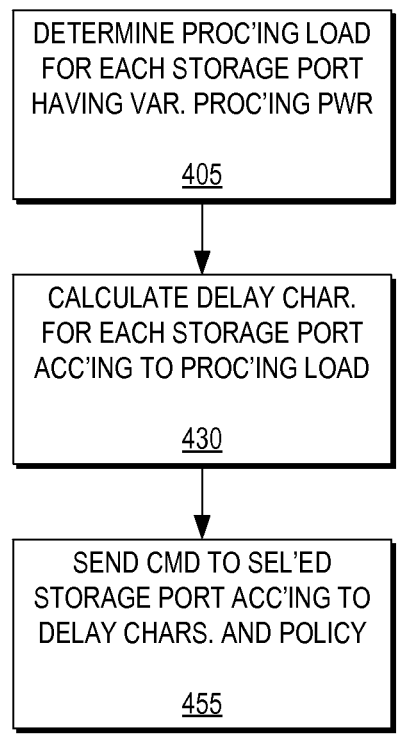
FIG. 4 is a flow diagram illustrating a method according to an example embodiment of the present invention.

FIG. 4 is a flow diagram illustrating a method according to an example embodiment of the present invention. FIG. 4 may be described in conjunction with FIG. 1.

As illustrated in FIGS. 1 and 4, in order to perform load balancing for port selection in a multipathing environment 100, a host 105 may determine a processing load for each storage port S in a plurality of storage ports S having variable processing power (405) and then calculate a delay characteristic for each storage port S of the plurality of storage ports S according to its processing load (430). The host 105 then may send a command to a selected storage port S of the plurality of storage ports S according to the delay characteristics and a policy (455).

In order for the multipathing driver 110 to determine which storage port S to send a command (i.e., an I/O), the multipathing driver 110 may query the storage ports S for the following information (it should be understood that the multipathing driver 110 queries each FA in the storage system 160, and that the multipathing driver 110 may query one storage port on a particular FA which may return values for all storage ports on the FA or the host may query each individual storage port which may return is own values alone):

K—queue length; the number of commands (i.e., I/Os) queued for processing at a storage port. It should be understood that, in certain embodiments, the multipathing driver 110 may not know which host 105 commands came from (e.g., host 1 $105_1$ or host 2 $105_2$) but rather may only be aware of the number of commands to be sent (i.e., host port queue depth).

M—command count received in a previous period from all hosts ports H on this storage port S. It should be understood that, in certain embodiments, if a storage port S does not have a deep queue in a current period, it is not necessarily indicative of a queue depth for a previous period (i.e., a host port H may have been hammering the storage port S in the previous period but the queued I/Os have since been processed). The value of M may be indicative of a likelihood of queue depth in the future based on past depth.

$T_{proc\_cmd}$—average time to process a single command on the storage port. It should be understood that command processing time may be a function of both command size and storage port resources. In example embodiments of the present invention, an assumption may be made that the average time to process a command will stay about the same in the future and may be calculated as a moving average which is affected by port's resources and the commands received. Further, it should be understood that, for example, a remote replication command may skew the value of $T_{proc\_cmd}$, but such weighting must be taken into account as it impacts the storage port's ability to process commands (i.e., remote replication waits for a status from the remote storage array; therefore, the time to process includes not only the time for a local write but also the time for the remote write.).

Figures 5A, 5B:
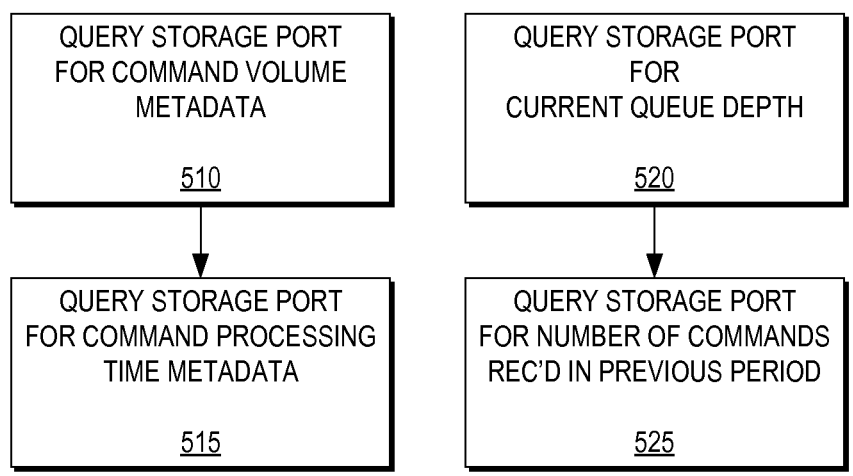
FIGS. 5A-5B are flow diagrams illustrating methods for querying storage ports to process metadata according to respective example embodiments of the present invention.

FIGS. 5A-5B are flow diagrams illustrating methods for querying storage ports S for processing metadata according to respective example embodiments of the present invention. FIGS. 5A-5B may be described in conjunction with FIGS. 1 and 4.

As illustrated in FIGS. 1, 4, and 5A, to determine a processing load for each storage port S in a plurality of storage ports S having variable processing power (405), the host 105 may query $150_1$, $150_2$ the storage port S for command volume metadata ($T_{PROC\_CMD}$) $155_1$, $155_2$ (510) and query the storage port S for command processing time metadata (515). As illustrated in FIGS. 1 and 5B, the host 105 may query $130_1$, $130_2$ the storage port S for a current queue depth (K) $135_1$, $135_2$ (520) and query $140_1$, $140_2$ the storage port S for a previous number of commands received in a previous period (M) $145_1$, $145_2$ (525).

Figure 2:
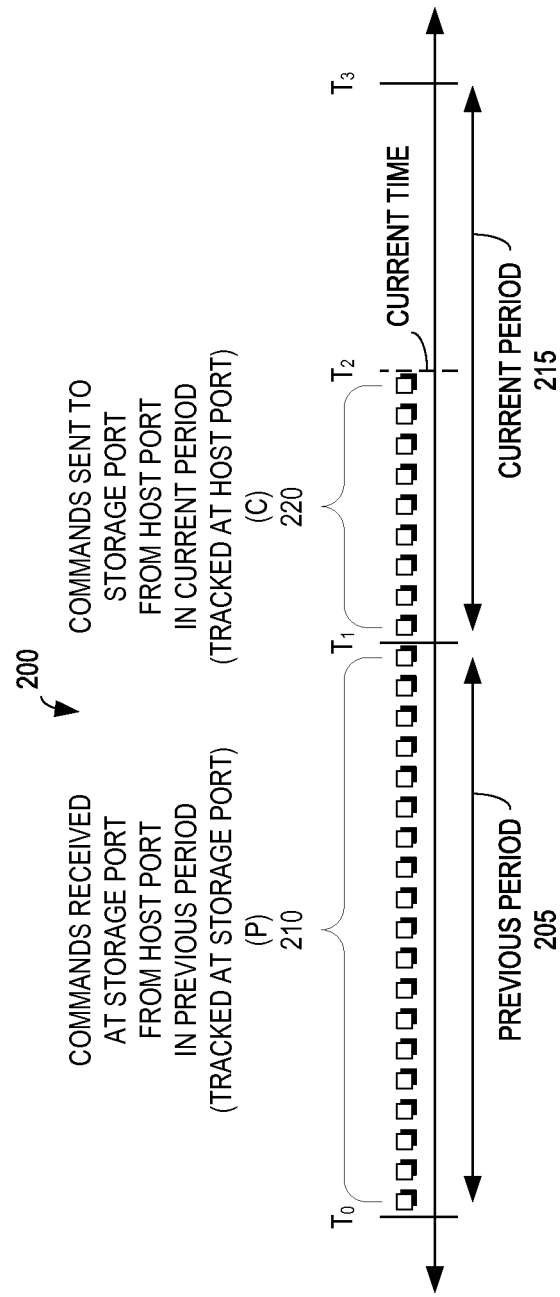
FIG. 2 is a timeline of a plurality of commands received in a previous and in a current period at a storage port according to an example embodiment of the present invention.

FIG. 2 is a timeline 200 of a plurality of commands (i.e., I/Os) 210, 220 received in a previous period 205 and in a current period 215 at a storage port according to an example embodiment of the present invention. As illustrated in FIG. 2, a storage port (e.g., S1-S6 of FIG. 1) may periodically monitor a number of commands received at the storage port per period. For example, in a previous period 205 from time $T_0$ to time $T_1$, the storage port may receive a first set of commands 210 and track a number of commands received during the previous period 205 (P). Likewise, in a current period from time $T_1$ to time $T_3$, the storage port may receive a second set of commands 220 and track a number of commands received up to a current time $T_2$ during the current period 215 (C). It should be noted that, in a preferred embodiment as illustrated in FIG. 2, the number of commands received at the storage port from the host port in the current period (C) is continually updated as commands are sent from the host port to the storage ports so that a value of the number of commands sent to each storage port in the current period (or portion thereof) (i.e., the number of commands sent from each host port to each storage port from the start of the current period to the current time (e.g., $T_2$)) is available despite the fact that the entire current period 215 has not yet passed.

Figure 3:
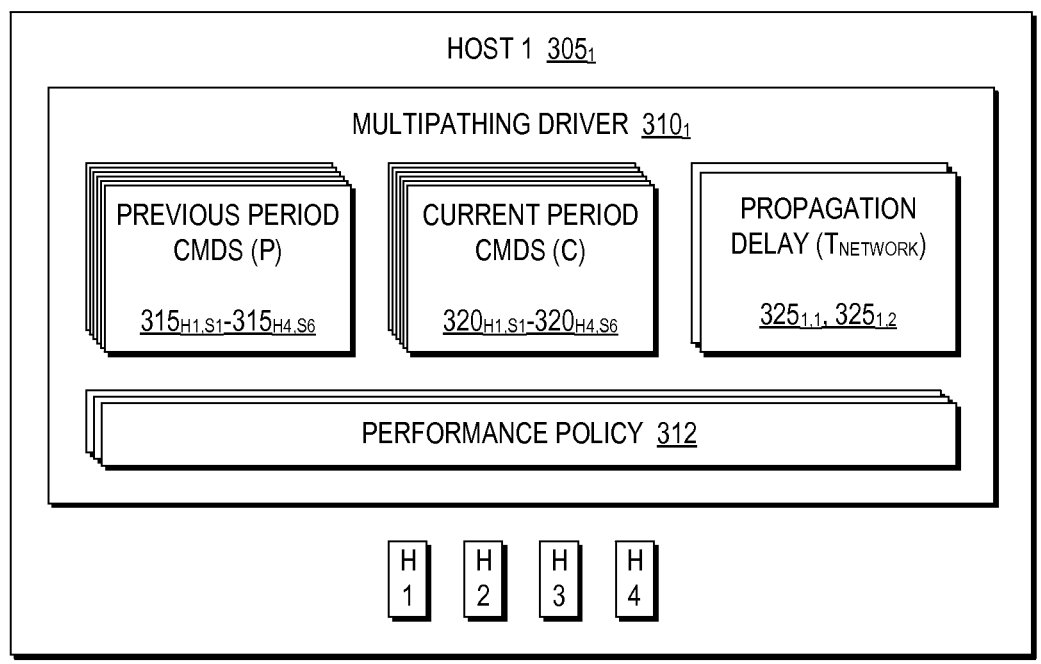
FIG. 3 is a block diagram of a host, including a multipathing driver, according to an example embodiment of the present invention.

FIG. 3 is a block diagram of a host $305_1$ (e.g., host $105_1$ of FIG. 1), including a multipathing driver $310_1$, according to an example embodiment of the present invention. As illustrated in FIG. 3, the multipathing driver $310_1$ may store a plurality of values for respective storage ports S and FAs in the multipathing environment: a plurality of values for the number of commands received in the previous period P $315_{H1,S1}$-$315_{H4,S6}$, a plurality of values for the number of commands received in a current period C $320_{H1,S1}$-$320_{H4,S6}$, a plurality of propagation delay values for respective FAs $T_{NETWORK}$ 325$_{1,1}$, 325$_{1,2}$, and a plurality of performance policies 312.

Further, as illustrated in FIG. 3, the multipathing driver 310 may have the following metrics available per host port H at the host:

P—number of commands sent from the host port H to a storage port S in a previous period. It should be understood that the value of P and the value of M allow the multipathing driver 310 to calculate the amount of traffic received at a storage port S from all other hosts 310 in the previous period. The value of M-P assumes other clients will not change their load.

C—number of commands sent from the host port H to a storage port S in a current period. It should be understood that the multipathing driver 310 may not determine the number of commands received at a storage port S from all other hosts 305 in the current period (similar to the values of P and M, above) because the current period is, in particular embodiments, a partial period.

$T_{network}$—propagation delay of commands from the multipathing driver 310 to the storage system 160. It should be understood that there is an inherent time necessary for commands to be sent from the hosts 105 to the storage system 160, such as through one or more switches. In certain embodiments, the host 105 may measure $T_{network}$ using a ping-like command (e.g.,: test unit ready (TUR) which requires no processing at the storage system 160 for response). In a preferred embodiment, $T_{network}$ is monitored per host port/storage port pair.

The multipathing driver 310 then may select, according to a performance policy 312, a port to send the next command. In a preferred embodiment, the multipathing driver 310 uses the following function:

$$\text{Port}=\min(T_{network}+((K+C+M-P)\times T_{prod\_cmd})).$$

It should be understood that, in a preferred embodiment, the calculation of the preferred port for sending commands is not necessarily happening on a periodic basis because the mulitpathing driver 310 should prioritize sending I/Os to the storage system 160 over the calculation.

Figures 6A, 6B:
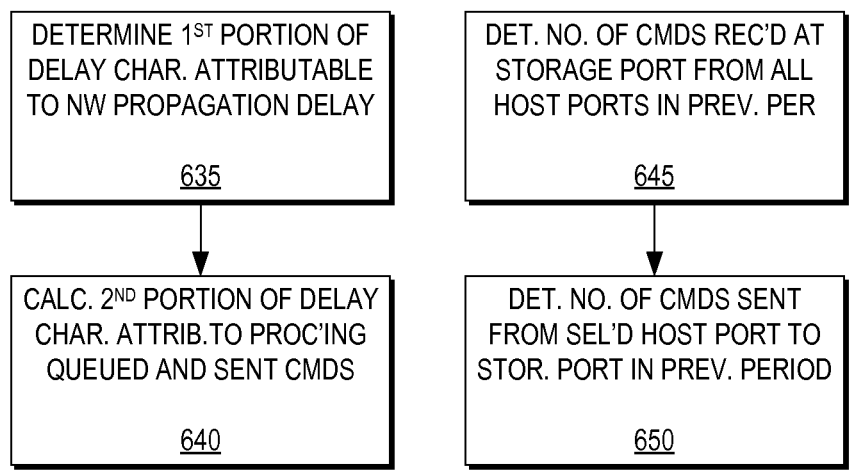
FIGS. 6A-6B are flow diagrams illustrating methods for calculating a delay characteristic according to respective example embodiments of the present invention.

FIGS. 6A-6B are flow diagrams illustrating methods for calculating a delay characteristic according to respective example embodiments of the present invention. FIGS. 6A-6B may be described in conjunction with FIGS. 3 and 4.

As illustrated in FIGS. 3, 4, and 6A, to calculate a delay characteristic for each storage port S of the plurality of storage ports according to its processing load (430), the host 305$_1$ may determine a first portion of the delay characteristic attributable to network propagation delay (i.e., $T_{network}$) (635) and calculate a second portion of the delay characteristic attributable to processing commands in the queue at the storage port and a number of commands sent to the storage port (640).

In certain embodiments, the host 305$_1$ may calculate the second portion of the delay characteristic according to an average time to process a single command on the storage port (i.e., $T_{proc\_cmd}$), such as by calculating a first subportion of the second portion of the delay characteristic according to a sent number of commands sent to the storage port in a previous period from all other host ports other than a selected host port (i.e., M-P).

As illustrated in FIG. 6B, the host may calculate a first subportion of the second portion of the delay characteristic according to a sent number of commands sent to the storage port in a previous period from all other host ports other than a selected host port by determining a received previous number of commands received at the storage port from all host ports in the previous period (M) (645) and determining a sent previous number of commands sent from the selected host port to the storage port in the previous period (P) (650). Additionally, the host may calculate a second subportion of the second portion of the delay characteristic according to a current number of commands sent from the selected host port to the storage port in a current period (C).

Therefore, the multipathing driver 310 relies on the command information for the last full second plus whatever I/Os the host port sent to the storage system 160 in the current second or fraction thereof. Taking the current fraction of a second into account is an effort to make the port selection more accurate (i.e., since it may be that in this second there are more I/Os sent than in previous second). Further, using the "latest" data helps provide a more accurate calculation as the multipathing driver 310 may not perform the calculation for each host port at the same time, thereby reducing calculation overhead.

Figure 7:
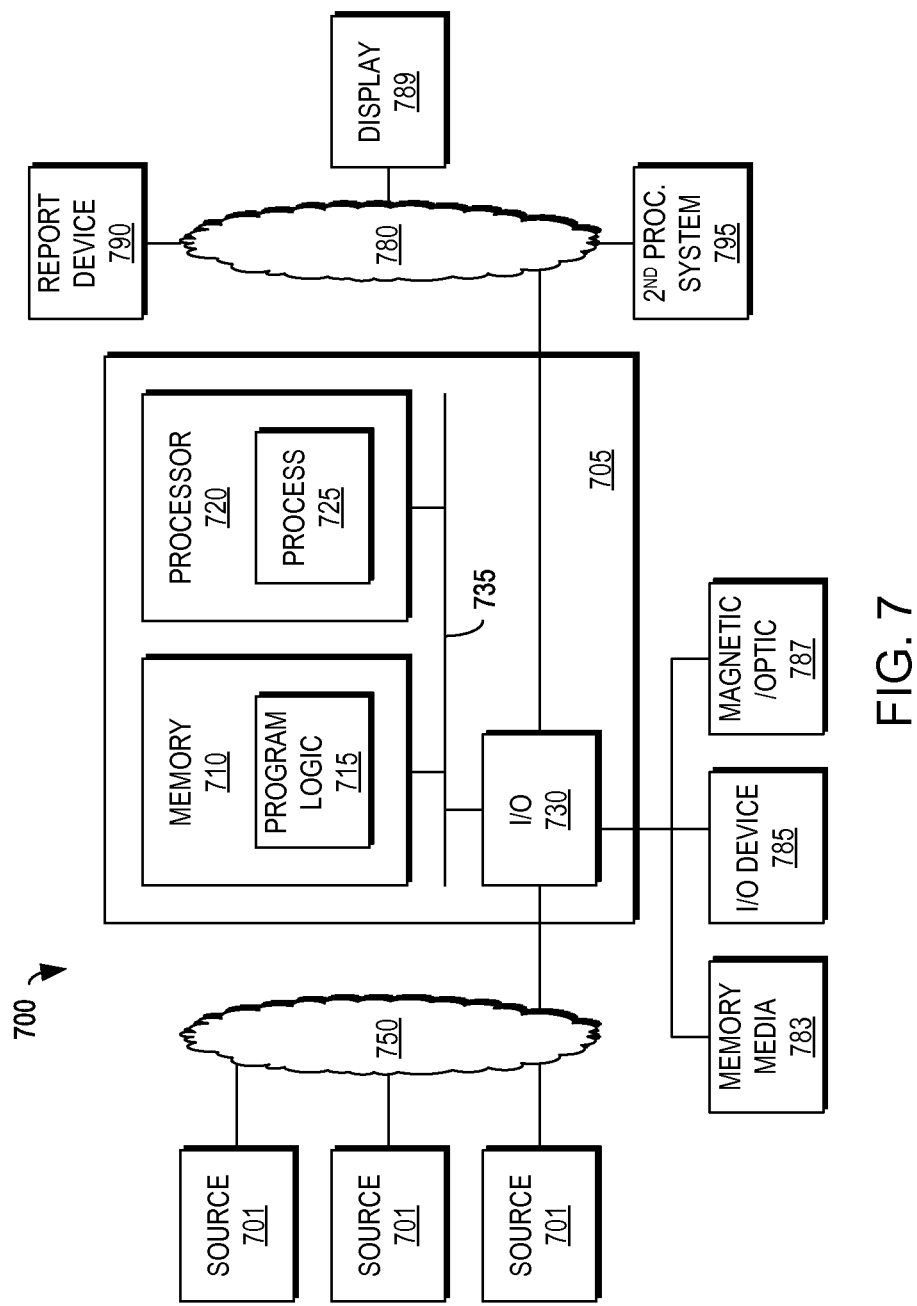
FIG. 7 is a block diagram of an apparatus according to example embodiment of the present invention.

FIG. 7 is a block diagram of an example embodiment apparatus 705 according to the present invention. The apparatus 705 may be part of a system 700 and includes memory 710 storing program logic 715, a processor 720 for executing a process 725, and a communications I/O interface 730, connected via a bus 735. The I/O interface 730 may provide connectivity to memory media 783, I/O device 785, and drives 787, such as magnetic or optical drives. The apparatus 705 is configured to communicate with a plurality of sources 701 via a network 750 using the I/O interface 730. The apparatus 705 is further configured to communicate with a display 789, a report device 790, and a second processiim system 795 via a network 780 using the I/O interface 730.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 8:
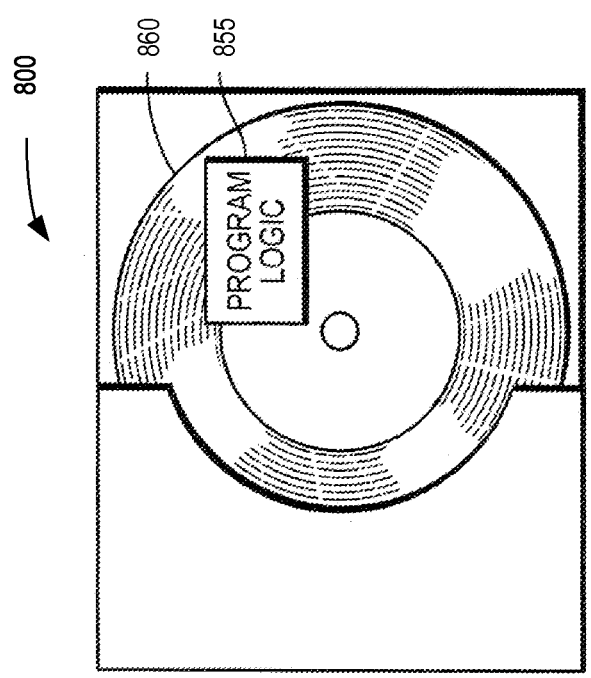
FIG. 8 is an illustration of computer program code according to an example embodiment of the present invention.

FIG. 8 shows program logic 855 embodied on a computer-readable medium 860 as shown, and wherein the logic 855 is encoded in computer-executable code configured for carrying out the methods of this invention, thereby forming a computer program product 800.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
   determining a processing load for each storage port in a plurality of storage ports wherein each storage port has an amount of dynamically assigned processing cores;
   calculating a delay characteristic for each storage port of the plurality of storage ports according to its processing load; and
   sending a command to a selected storage port of the plurality of storage ports according to the delay characteristics and a policy;
   wherein determining the processing load for each storage port comprises:
      sending a query to one of a set of two or more of the plurality of storage ports associated with a given front-end adapter of a storage system; and
      receiving, from one of the set of two or more storage ports associated with the given front-end adapter of the storage system, processing load information for each storage port in the set of two or more storage ports associated with the given front-end adapter of the storage system; and
   wherein determining the processing load for each storage port further comprises at least one of:
      querying said one of the set of two or more storage ports associated with the given front-end adapter of the storage system for command volume metadata associated with each of the storage ports in the set of two or more storage ports associated with the given front-end adapter of the storage system; and
      querying said one of the set of two or more storage ports associated with the given front-end adapter of the storage system for command processing time metadata associated with each of the storage ports in the set of two or more storage ports associated with the given front-end adapter of the storage system.

2. The method of claim 1 wherein determining the processing load for each storage port comprises:
   querying said one of the set of two or more storage ports associated with the given front-end adapter of the storage system for the command volume metadata associated with each of the storage ports in the set of two or more storage ports associated with the given front-end adapter of the storage system; and
   querying said one of the set of two or more storage ports associated with the given front-end adapter of the storage system for the command processing time metadata associated with each of the storage ports in the set of two or more storage ports associated with the given front-end adapter of the storage system.

3. The method of claim 1 wherein querying said one of the set of two or more storage ports associated with the given front-end adapter of the storage system for the command volume metadata further comprises:
   querying said one of the set of two or more storage ports associated with the given front-end adapter of the storage system for a current queue depth of each of the storage ports in the set of two or more storage ports associated with the given front-end adapter of the storage system; and
   querying said one of the set of two or more storage ports associated with the given front-end adapter of the storage system for a previous number of commands received in a previous period for each of the storage ports in the set of two or more storage ports associated with the given front-end adapter of the storage system.

4. The method of claim 3 wherein querying said one of the set of two or more storage ports associated with the given front-end adapter of the storage system for the command processing time metadata further comprises querying said one of the set of two or more storage ports associated with the given front-end adapter of the storage system for an average time to process a single command on each of the storage ports in the set of two or more storage ports associated with the given front-end adapter of the storage system.

5. The method of claim 4 wherein the average time to process a single command on each of the storage ports in the set of two or more storage ports associated with the given front-end adapter of the storage system comprises a moving average of processing times for the previous period for each of the storage ports in the set of two or more storage ports associated with the given front-end adapter of the storage system.

6. The method of claim 1 wherein calculating the delay characteristic for each storage port of the plurality of storage ports according to its processing load comprises, for a given storage port:
   determining a first portion of the delay characteristic attributable to network propagation delay; and
   calculating a second portion of the delay characteristic attributable to processing commands in a queue at the given storage port and a number of commands sent to the given storage port.

7. The method of claim 6 wherein calculating the second portion of the delay characteristic attributable to processing commands in the queue at the given storage port and the number of commands sent to the given storage port comprises calculating the second portion of the delay characteristic according to an average time to process a single command on the given storage port.

8. The method of claim 7 wherein calculating the second portion of the delay characteristic according to the average time to process a single command on the given storage port comprises calculating a first subportion of the second portion of the delay characteristic according to a sent number of commands sent to the given storage port in a previous period from one or more host ports other than a selected host port.

9. The method of claim 8 wherein calculating the first subportion of the second portion of the delay characteristic according to the sent number of commands sent to the given storage port in the previous period from the one or more host ports other than the selected host port comprises:
   determining a received previous number of commands received at the given storage port from all host ports in the previous period; and
   determining a sent previous number of commands sent from the selected host port to the given storage port in the previous period.

10. The method of claim 8 further comprising calculating a second subportion of the second portion of the delay characteristic according to a current number of commands sent from the selected host port to the given storage port in a current period.

11. A system comprising:
    a plurality of hosts each comprising respective host ports; and
    a storage system comprising a plurality of storage ports having variable processing power; and computer program code that when executed on a processor of a computer causes the computer to perform the operations of:
  determining a processing load for each storage port in a plurality of storage ports wherein each storage port has an amount of dynamically assigned processing cores;
  calculating a delay characteristic for each storage port of the plurality of storage ports according to its processing load; and
  sending a command to a selected storage port of the plurality of storage ports according to the delay characteristics and a policy;
  wherein determining the processing load for each storage port comprises:
    sending a query to one of a set of two or more of the plurality of storage ports associated with a given front-end adapter of a storage system; and
    receiving, from one of the set of two or more storage ports associated with the given front-end adapter of the storage system, processing load information for each storage port in the set of two or more storage ports associated with the given front-end adapter of the storage system; and
  wherein determining the processing load for each storage port further comprises at least one of:
    querying said one of the set of two or more storage ports associated with the given front-end adapter of the storage system for command volume metadata associated with each of the storage ports in the set of two or more storage ports associated with the given front-end adapter of the storage system; and
    querying said one of the set of two or more storage ports associated with the given front-end adapter of the storage system for command processing time metadata associated with each of the storage ports in the set of two or more storage ports associated with the given front-end adapter of the storage system.

12. The system of claim 11 wherein determining the processing load for each storage port comprises:
  querying said one of the set of two or more storage ports associated with the given front-end adapter of the storage system for the command volume metadata associated with each of the storage ports in the set of two or more storage ports associated with the given front-end adapter of the storage system; and
  querying said one of the set of two or more storage ports associated with the given front-end adapter of the storage system for the command processing time metadata associated with each of the storage ports in the set of two or more storage ports associated with the given front-end adapter of the storage system.

13. The system of claim 11 wherein querying said one of the set of two or more storage ports associated with the given front-end adapter of the storage system for command volume metadata further comprises:
  querying said one of the set of two or more storage ports associated with the given front-end adapter of the storage system for a current queue depth of each of the storage ports in the set of two or more storage ports associated with the given front-end adapter of the storage system; and
  querying said one of the set of two or more storage ports associated with the given front-end adapter of the storage system for a previous number of commands received in a previous period for each of the storage ports in the set of two or more storage ports associated with the given front-end adapter of the storage system.

14. The system of claim 13 wherein querying said one of the set of two or more storage ports associated with the given front-end adapter of the storage system for the command processing time metadata further comprises querying said one of the set of two or more storage ports associated with the given front-end adapter of the storage system for an average time to process a single command on each of the storage ports in the set of two or more storage ports associated with the given front-end adapter of the storage system.

15. The system of claim 14 wherein the average time to process a single command on each of the storage ports in the set of two or more storage ports associated with the given front-end adapter of the storage system comprises a moving average of processing times for the previous period for each of the storage ports in the set of two or more storage ports associated with the given front-end adapter of the storage system.

16. The system of claim 11 wherein calculating the delay characteristic for each storage port of the plurality of storage ports according to its processing load comprises, for a given storage port:
  determining a first portion of the delay characteristic attributable to network propagation delay; and
  calculating a second portion of the delay characteristic attributable to processing commands in a queue at the given storage port and a number of commands sent to the given storage port.

17. The system of claim 16 wherein calculating the second portion of the delay characteristic attributable to processing commands in the queue at the given storage port and the number of commands sent to the given storage port comprises calculating the second portion of the delay characteristic according to an average time to process a single command on the given storage port.

18. The system of claim 17 wherein calculating the second portion of the delay characteristic according to the average time to process a single command on the given storage port comprises calculating a first subportion of the second portion of the delay characteristic according to a sent number of commands sent to the given storage port in a previous period from one or more of the host ports other than a selected one of the host ports.

19. The system of claim 18 wherein calculating the first subportion of the second portion of the delay characteristic according to the sent number of commands sent to the given storage port in the previous period from the one or more host ports other than the selected host port comprises:
  determining a received previous number of commands received at the given storage port from all host ports in the previous period; and
  determining a sent previous number of commands sent from the selected host port to the given storage port in the previous period.

20. The system of claim 18 wherein calculating the second portion of the delay characteristic according to the average time to process a single command on the given storage port further comprises calculatin 1 g a second subportion of the second portion of the delay characteristic according to a current number of commands sent from the selected host port to the given storage port in a current period.

21. A computer program product including a non-transitory computer-readable storage medium having computer program code encoded thereon that when executed on a processor of a computer causes the computer to perform multipathing according to storage port processing load, the computer program code comprising:
  computer program code for determining a processing load for each storage port in a plurality of storage ports wherein each storage port has an amount of dynamically assigned processing cores;
  computer program code for calculating a delay characteristic for each storage port of the plurality of storage ports according to its processing load; and
  computer program code for sending a command to a selected storage port of the plurality of storage ports according to the delay characteristics and a policy;
  wherein determining the processing load for each storage port comprises:
    sending a query to one of a set of two or more of the plurality of storage ports associated with a given front-end adapter of a storage system; and
    receiving, from one of the set of two or more storage ports associated with the given front-end adapter of the storage system, processing load information for each storage port in the set of two or more storage ports associated with the given front-end adapter of the storage system; and
  wherein determining the processing load for each storage port further comprises at least one of:
    querying said one of the set of two or more storage ports associated with the given front-end adapter of the storage system for command volume metadata associated with each of the storage ports in the set of two or more storage ports associated with the given front-end adapter of the storage system; and
    querying said one of the set of two or more storage ports associated with the given front-end adapter of the storage system for command processing time metadata associated with each of the storage ports in the set of two or more storage ports associated with the given front-end adapter of the storage system.

* * * * *